UNITED STATES PATENT OFFICE.

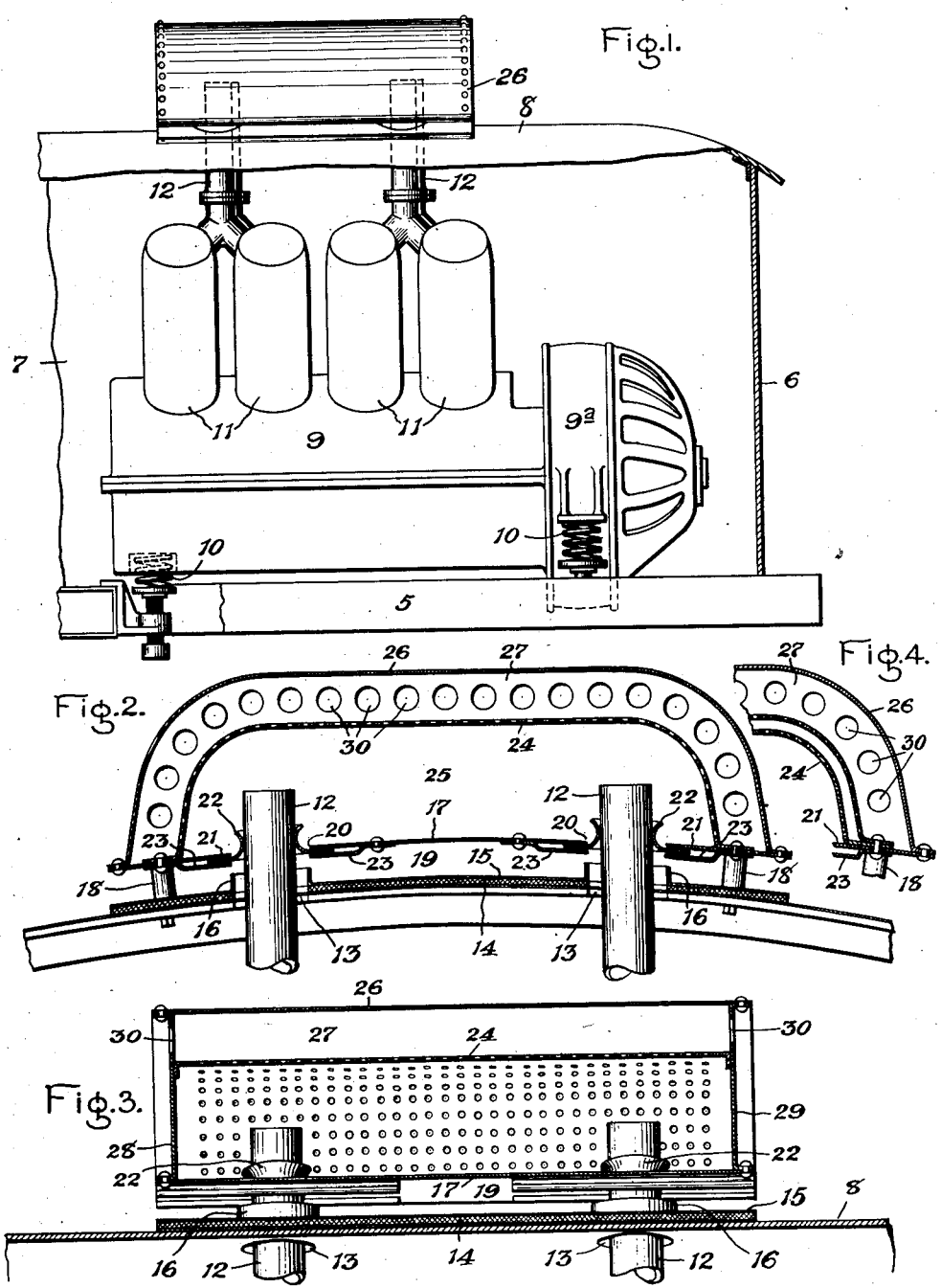

HENRI G. CHATAIN, OF ERIE, PENNSYLVANIA, ASSIGNOR TO GENERAL ELECTRIC COMPANY, A CORPORATION OF NEW YORK.

EXHAUST-MUFFLER.

1,110,040.  Specification of Letters Patent.  Patented Sept. 8, 1914.

Application filed August 7, 1913. Serial No. 783,529.

*To all whom it may concern:*

Be it known that I, HENRI G. CHATAIN, a citizen of the United States, residing at Erie, county of Erie, State of Pennsylvania, have invented certain new and useful Improvements in Exhaust-Mufflers, of which the following is a specification.

The present invention relates to mufflers or exhaust silencers for internal combustion engines, and particularly to those employed on the so-called motor cars which run on fixed metal rails or tracks and have the engine located inside of a cab, and has for its object to improve and simplify their construction as will be set forth more fully hereinafter.

In the accompanying drawing which illustrates one of the embodiments of my invention, Figure 1 is a view of the cab end of a motor car with certain of the parts broken away; Fig. 2 is a cross-section of the muffler; Fig. 3 is a longitudinal section of the same, and Fig. 4 is a sectional view of a slight modification.

5 indicates the sills of the car body which are supported on trucks in the usual manner, 6 the front wall of the cab, 7 one of the sides and 8 the roof.

Inside of the cab is an internal combustion engine 9 directly connected to an electric generator 9ª which supplies current to the propelling motors mounted on the trucks. In order to prevent vibrations of the engine and generator from being transmitted through the floor sills to the passenger compartment in the rear of the cab, the engine and generator are mounted on suitable springs 10. As a result of this the engine has slight rocking movements independent of the floor sills and roof which necessitate a special connection between the exhaust pipes and the muffler as will appear later.

11 indicates the cylinders of the engine of which there are eight arranged in two rows of four each. The number and arrangement of the cylinders is, however, unimportant.

Connected to the cylinders are exhaust pipes 12, there being four in the present case. These pipes are rigidly mounted on the engine and hence move with it. In the roof of the cab are as many openings 13 as there are exhaust pipes. These are purposely made considerably larger than the pipes so that movements of the engine independently of the roof will not cause the parts to bind or cramp. This also permits the roof to sway laterally as it does without affecting the engine. The arrangement also prevents the heat of the exhaust pipes from charring the wood work. On top of the roof is a body of heat resisting material 14, such as asbestos, for example. Mounted on top of the asbestos is a thin metallic protection plate 15 which has as many openings as there are exhaust pipes, each opening having an upturned flange 16 to prevent water on the roof from running down into the cab. This latter is facilitated by the fact that the muffler as a whole projects a considerable distance beyond the flanges at all points.

Mounted above the protection plate on the roof is the muffler 17. Locating it on the roof of the cab has many advantages over locating it inside thereof, the principal of which are as follows: It prevents any leakage of gas therefrom from vitiating the air in the cab; it prevents the heat dissipated thereby from affecting the temperature in the cab; it avoids the use of a heat resisting jacket; it can be made as large as desired to cool the exhaust gases by exposing large surfaces to the air currents; it occupies space which is not particularly valuable, and can be readily installed or removed without disturbing the engine.

The muffler has a bottom wall or base 17 made of sheet iron of suitable thickness. This wall is supported by a number of short posts or spacers 18 so that a free air space 19 is provided between it and the roof. These posts or spacers may advantageously be secured to the muffler, and the muffler as a whole secured to the roof by bolts that extend through it into the posts. In the wall or base 17 are as many openings 20 as there are exhaust pipes, each opening being considerably greater in diameter than its exhaust pipe to permit of relative independent movement of the parts. As it is necessary to make a comparatively gas tight joint between the exhaust pipes and the bottom wall 17 of the muffler, a sliding washer or thimble is provided for each pipe. Each comprises a flat portion 21 that slides on the wall and a vertical portion 22 that closely surrounds the pipe. The vertical portion is curved as shown so that the point of contact between it and the pipe will be small. This is to prevent binding or cramping due to slight rocking motions of the parts from any cause. Below the sliding washer, and rivited to the wall, is plate 23 that forms a guide and housing therefor.

Bolted or otherwise secured to the base or wall 17 is a thin metallic perforated baffle plate 24 that forms the upper and two side walls of the chamber 25, the latter receiving exhaust gases from the pipes 12. Instead of a single perforated baffle plate or wall a number can be provided, as shown in Fig. 4, where a greater muffling effect is desired. Surrounding the plate or wall on the top and two sides is an imperforated cover 26 made of sheet metal, the ends of which are turned outwardly and bolted or otherwise secured to the wall 17. Between the plates 24 and 26 is a chamber 27 from which the gases escape to atmosphere. The ends of the chambers 25 and 27 are closed in by heads 28 and 29. These are also formed of sheet metal and are riveted or otherwise secured to the base 17 and cover 26. The portions of the heads inclosing the chamber 25 are made solid while those inclosing the chamber 27 are provided with relatively large holes 30 through which the gases escape. The projecting ends of the cover serve to protect the holes 30 from the weather to a certain extent.

When the engine is in operation the exhaust pipes discharge gases into the relatively large chamber 25 where it expands and its temperature is considerably reduced. From here it passes through the perforations in the plate or wall 24 either into second cooling and expanding chamber as in Fig. 4 or directly into the chamber 27 from which it escapes by the holes 30.

By making the muffler out of sheet iron as shown, it is cheap to construct, requires no special machinery for bending the parts to shape, and is light in weight. Further, it is easily mounted on or detached from the car. The perforated baffle plate adjacent the ends of the exhaust pipe, which is subject to the erosive action of the gases, can be readily removed when injured and a new one substituted. As a general proposition the height of the muffler above the roof is the only limiting factor. By spreading it out fore and aft as well as sidewise the cubical contents of the chambers can be made as great as are necessary or desired. Enlarging the chambers has of course the effect of increasing the cooling action on the gases as is therefore desirable.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In combination, a cab, an internal combustion engine located therein, a muffler mounted on the roof of the cab, comprising a base plate spaced from the roof to form an air space between it and the roof and walls carried by the base plate forming a chamber therewith, said walls having openings for the escape of gases to atmosphere, and conduit means projecting through the roof of the car and across said space and through the base plate for conveying exhaust gases from the engine to the muffler.

2. In combination, a cab, an internal combustion engine located therein, a muffler mounted on the roof of the cab, a conduit for conveying exhaust gases from the engine to the muffler, which conduit communicates with an opening in a wall of the muffler, and a device that closely surrounds the conduit and is movable with respect to the wall of the muffler to maintain a relatively tight gas joint between said parts.

3. In combination, a cab, an internal combustion engine located therein, a muffler mounted on the roof of the cab, a body of heat resisting material between the roof and muffler, there being an opening therein through which the conduit conveying gases can pass, a conduit that is rigidly attached to the engine and extends through the roof, the heat resisting material and the base of the muffler, and yielding means for making a relatively gas tight joint between the conduit and base of the muffler.

4. In a muffler adapted to be mounted on a cab roof and comprising a base, a perforated wall above the base, end walls uniting the perforated wall and the base, said walls and base forming a chamber, a cover for the perforated wall, there being a chamber between the two, means permitting the gases to escape to atmosphere from this last named chamber, and a conduit that projects through the base for conveying exhaust gases to the first mentioned chamber.

5. In a muffler adapted to be mounted on a cab roof and comprising a base, one or more perforated walls above the base forming chambers, a cover for the outer wall and separated therefrom by a chamber, said walls and cover being supported by the base, walls that form the ends of all the chambers and have perforations to permit exhaust gases to escape from the chamber directly under the cover, a conduit that extends through an opening in the base into the chamber immediately above it, and a means which surrounds the conduit, slides with respect to the base and acts to maintain a relatively gas tight joint between said conduit and base.

In witness whereof, I have hereunto set my hand this 5th day of August 1913.

HENRI G. CHATAIN.

Witnesses:
HENRY W. STOCK,
O. T. FOUCHE.